US012794186B1

(12) United States Patent
Lier et al.

(10) Patent No.: US 12,794,186 B1
(45) Date of Patent: Nov. 10, 2026

(54) SUPPORT STUBS IN ADDITIVELY MANUFACTURED COAXIAL RF STRUCTURES

(71) Applicants: Lockheed Martin Corporation, Bethesda, MD (US); The Regents of the University of Colorado, Denver, CO (US)

(72) Inventors: Erik Lier, Lakewood, CO (US); Thomas Henry Hand, Highlands Ranch, CO (US); Dejan S. Filipovic, Lafayette, CO (US); Jake Alexander Cazden, Boulder, CO (US); Ljubodrag Blagoje Boskovic, Mead, CO (US)

(73) Assignees: LOCKHEED MARTIN CORPORATION, Bethesda, MD (US); THE REGENT'S OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 408 days.

(21) Appl. No.: 18/348,454

(22) Filed: Jul. 7, 2023

Related U.S. Application Data

(60) Provisional application No. 63/359,096, filed on Jul. 7, 2022.

(51) Int. Cl.

| | |
|---|---|
| ***H01P 3/06*** | (2006.01) |
| ***H01Q 1/36*** | (2006.01) |
| ***H01Q 1/50*** | (2006.01) |
| ***H01R 24/42*** | (2011.01) |
| ***H01R 24/54*** | (2011.01) |
| ***H01R 43/16*** | (2006.01) |
| *H01R 101/00* | (2006.01) |

(52) U.S. Cl.
CPC ............. *H01R 24/542* (2013.01); *H01Q 1/36* (2013.01); *H01Q 1/50* (2013.01); *H01R 24/42* (2013.01); *H01R 43/16* (2013.01); *H01R 2101/00* (2013.01); *H01R 2201/02* (2013.01)

(58) Field of Classification Search
CPC ...... H01R 24/40; H01R 24/42; H01R 24/542; H01R 2101/00; H01R 2201/02; H01P 3/00; H01P 3/02; H01P 3/06; H01P 5/22; H01P 5/227; H01Q 1/36; H01Q 1/362; H01Q 1/50
See application file for complete search history.

(56) References Cited

U.S. PATENT DOCUMENTS 4,670,724 A * 6/1987 Riblet .................... H01P 5/183 333/123
6,094,161 A * 7/2000 Cassen ...................... G01S 7/03 342/372
11,777,227 B1 * 10/2023 Wink .................. H01Q 21/064 343/702
(Continued)

*Primary Examiner* — Thai Pham

(57) ABSTRACT

Provided herein are various enhanced coaxial structures for radio frequency systems. These coaxial structures can be additively manufactured out of conductive material. In one example, a coaxial radio frequency structure comprises at least two ports and has a center conductor surrounded by an outer conductor that forms a cavity about the center conductor. Stub segments that support the center conductor within the cavity are formed as conductively coupling between the center conductor and the outer conductor.

9 Claims, 14 Drawing Sheets

(56) References Cited

U.S. PATENT DOCUMENTS

| | | | | |
|---|---|---|---|---|
| 12,230,876 | B1 * | 2/2025 | Wrigley | H01Q 1/50 |
| 2013/0323965 | A1 * | 12/2013 | Buenz | H01R 24/38<br>439/578 |
| 2015/0311575 | A1 * | 10/2015 | Brown | H01P 3/06<br>205/118 |
| 2017/0222295 | A1 * | 8/2017 | Uher | H01P 5/19 |
| 2020/0227805 | A1 * | 7/2020 | Brown | C25D 5/10 |

* cited by examiner

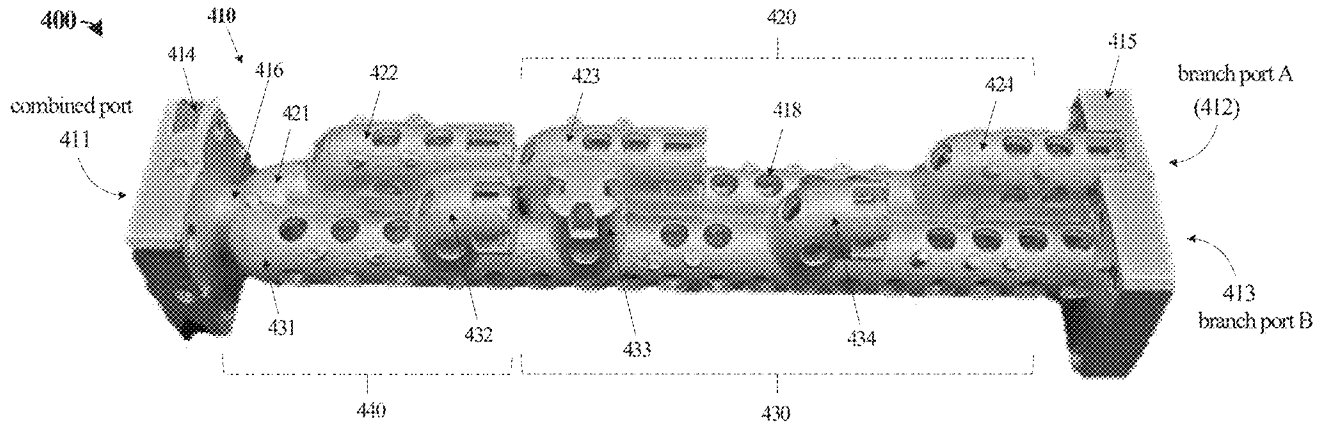
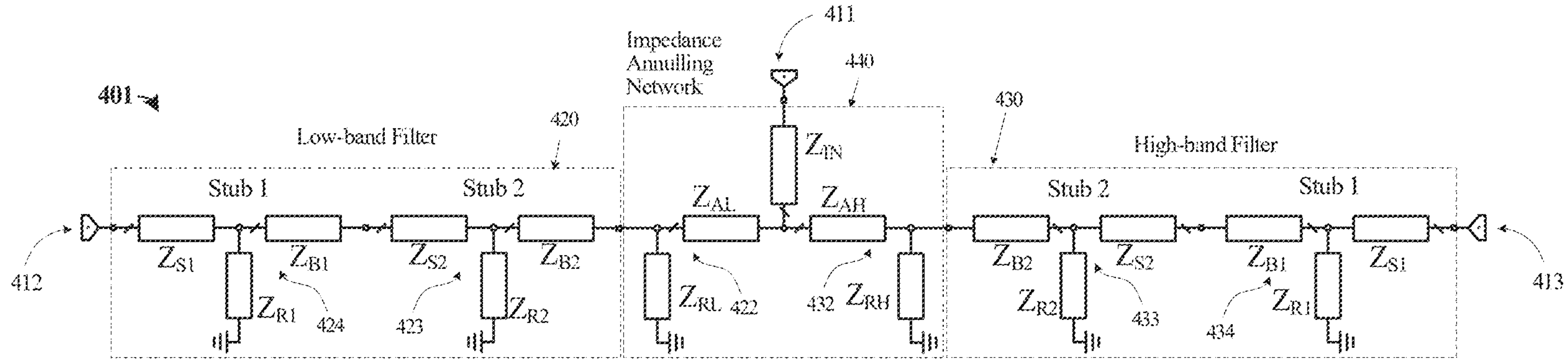
402
Diplexer Impedance Values
| | $Z_{S1}$ | $Z_{R1}$ | $Z_{B1}$ | $Z_{S2}$ | $Z_{R2}$ | $Z_{B2}$ |
|---|---|---|---|---|---|---|
| HIGH-BAND | 41 | 20 | 67 | 81 | 20 | 50 |
| LOW-BAND | 44 | 20 | 64 | 71 | 20 | 35 |
| | $Z_A$ | $Z_B$ |
|---|---|---|
| HIGH-BAND ANNULLING | 81 | 20 |
| LOW-BAND ANNULLING | 44 | 20 |
FIG. 4

600

| | $O_J$ | $D_J$ | OD | $ID_{Zs}$ | $ID_{Zr}$ | $ID_{Zb}$ | Ls | Lr | Lb |
|---|---|---|---|---|---|---|---|---|---|
| S1L | 1.3mm | 1.625mm | 3.5mm | 1.670mm | 2.510mm | 1.193mm | 11.665mm | 13.413mm | 11.298mm |
| S2L | 1.3mm | 1.75mm | 3.5mm | 1.075mm | 2.510mm | 1.938mm | 15.522mm | 13.260mm | 13.586mm |
| S1H | 1.3mm | 1.75mm | 3.5mm | 1.775mm | 2.510mm | 1.134mm | 8.561mm | 7.620mm | 6.990mm |
| S2H | 1.3mm | 1.125mm | 3.5mm | 0.900mm | 2.510mm | 1.516mm | 7.219mm | 7.075mm | 9.039mm |
| | | | | | | | | | |
| | $O_J$ | $D_J$ | OD | $ID_{ZA}$ | $ID_{ZR}$ | - | $L_A$ | $L_R$ | - |
| SAL | 1.3mm | 1.75mm | 3.5mm | 1.670mm | 2.510mm | - | 3.711mm | 14.103mm | - |
| SAH | 1.3mm | 1.5mm | 3.5mm | 0.911mm | 2.510mm | - | 11.176mm | 6.965mm | - |
| | | | | | | | | | |
| $L_{Taper}$ | 2mm | $OD_{Input}$ | 3.912mm | $ID_{Input}$ | 1.671mm | $ID_{inputEXT}$ | 1.867mm | $ID_{50\Omega}$ | 1.517mm |
| $T_{mat}$ | 0.75mm | $ID_{outputLow}$ | 1.867mm | $ID_{outputHigh}$ | 1.168mm | $L_{Transition}$ | 2.46mm | $L_{offset}$ | 12.796mm |
| $L_{StubOffset}$ | 0.263mm | | | | | | | | |

610

$$LR_{SAH} = LR_{SAH} - T_{mat} - \frac{OD}{2} - \frac{OD}{2}\frac{\pi}{2}$$
$$LR_{SAL} = LR_{SAL} - T_{mat} - \frac{OD}{2} - \frac{OD}{2}\frac{\pi}{2}$$
$$LR_{S1H} = LR_{S1H} - T_{mat} - \frac{OD}{2} - \frac{OD}{2}\frac{\pi}{2}$$
$$LR_{S1L} = LR_{S1L} - T_{mat} - \frac{OD}{2} - \frac{OD}{2}\frac{\pi}{2}$$
$$LR_{S2L} = LR_{S2L} - T_{mat} - \frac{OD}{2} - \frac{OD}{2}\frac{\pi}{2}$$

FIG. 6

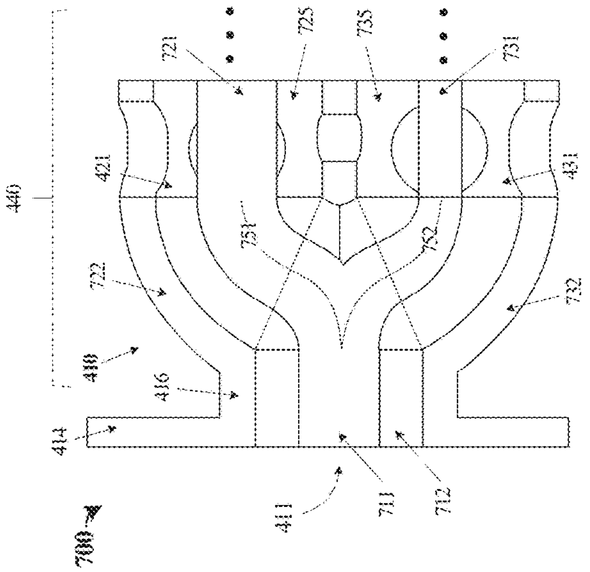
730
$$x = \frac{\left[\frac{OD}{2} + \frac{T_{mat}}{2}\right]}{2}$$
$$A = x + x' = \frac{OD}{2}$$
$$y = \sin(\alpha)\,A = \frac{\sin(\alpha) OD}{2}$$
$$\cos(\alpha) = \frac{x'}{A} = 1 - \frac{\left[\frac{OD}{2} + \frac{T_{mat}}{2}\right]}{OD}$$
$$\angle = \operatorname{atan}\left(\frac{ID_{output} - ID_{input}}{2\alpha A}\right)$$
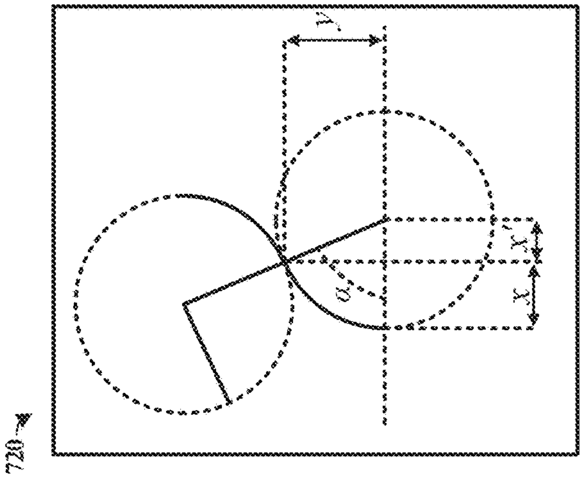
FIG. 7

1130

| | $Z_S$ | $Z_R$ | Zb | OD | $ID_{Zs}$ | $ID_{Zr}$ | $ID_{Zb}$ | Ls | Lr | Lb |
|---|---|---|---|---|---|---|---|---|---|---|
| **Stub 1** | 37.24Ω | 20.98Ω | 55Ω | 3.5mm | 1.879mm | 2.469mm | 1.397mm | 11.757mm | 13.861mm | 13.55mm |
| **Stub 2** | 84.26Ω | 43.16Ω | - | 5.676 | 1.397mm | 2.76mm | - | 13.133mm | 14.47mm | - |
| | | | | | | | | | | |
| **Input taper L** | 2mm | Input OD | | 3.912mm | Input ID | | 1.168mm | Inner Transition length | | 2.5mm |
| **Stub 1 $D_J$** | 1.5mm | Stub 1 $O_J$ | | 1.5mm | Stub 2 $D_J$ | | 1.6mm | Stub 2 $O_J$ | | - |
| **Wall thickness** | 0.75mm | | | | | | | | | - |

SUPPORT STUBS IN ADDITIVELY MANUFACTURED COAXIAL RF STRUCTURES

RELATED APPLICATIONS

This application hereby claims the benefit of and priority to U.S. Provisional Patent Application 63/359,096, titled "ANCHORING OF ADDITIVELY MANUFACTURED COAXIAL RF ELEMENTS," filed Jul. 7, 2022, which is hereby incorporated by reference in its entirety.

TECHNICAL BACKGROUND

Additive manufacturing (AM), such as 3D printing, is gaining popularity in many different areas across engineering and science with functional devices and systems being used for both prototyping and end use. Steadily improving accuracy of 3D printing technologies has led to increased adoption for radio frequency (RF) applications deep into millimeter-wave frequencies. Stand-alone components and integrated RF subsystems have been demonstrated in transmission line configurations mainly revolving around rectangular and ridge waveguides. Coaxial lines are not typically considered despite having various favorable characteristics, mainly due to the challenges associated with the physical support of the inner conductor. Instead, coaxial-line-based developments have been focused mainly in the realm of surface micromachining.

Processes such as PolyStrata®, a form of surface micromachining, can achieve monolithic integration around a nearly air-loaded rectangular coaxial line with interconnection of three to four vertical layers on a wafer scale. Other coaxial lines have been demonstrated in AM, such as a coaxial line formed by filling in a void in the center of a coaxial-printed dielectric with a liquid metal and coating the exterior to complete the coaxial line. While this technique has shown some success in a variety of applications, the challenge of post-processing steps, particularly ensuring correct filling with liquid metal conductor, begins to negate the benefit of AM. An alternative approach features a 3D printed coaxial filter geometry in stereolithography (SLA) or selective laser sintering (SLS) that is then metal-plated to achieve required functionality. Due to integration, tolerances, and required post-processing, this technique is somewhat limited in its widespread use for high-end components and systems. Moreover, these corresponding devices are narrowband and designed to work at lower frequencies.

SUMMARY

The examples herein discuss coaxial radio frequency (RF) elements designed for additive manufacturing (AM) and fabricated using AM (e.g., 3D printing techniques), such as Direct Metal Laser Sintering (DMLS), stereolithography (SLA), selective laser sintering (SLS), among others, that achieve target performance across wide instantaneous bandwidths of interest for many contemporary applications. In addition, various cross-sectional profiles of the coaxial RF structures can be achieved, such as circular, or any arbitrary cross-sectional shape without employing separate dielectric supports or dielectric spacers added for center conductor elements. To achieve manufacture of such RF elements, the examples herein include stub segments in an all-metal coaxial structure. For instance, stub segments can be conductively mated to a corresponding center conductor of a coaxial RF structure, such as a coaxial line, and these stub segments support the center conductor within a coaxial structure that forms the coaxial RF structure.

In one example, a coaxial radio frequency structure comprises at least two ports and has a center conductor surrounded by an outer conductor that forms a cavity about the center conductor. Stub segments that support the center conductor within the cavity are formed as conductively coupling between the center conductor and the outer conductor.

In another example, a method includes manufacturing a coaxial radio frequency structure. By an additive manufacturing process, the method includes forming a coaxial radio frequency structure comprising at least two ports and having a center conductor surrounded by an outer conductor that forms a cavity about the center conductor. Also, by the additive manufacturing process, the method includes forming stub segments conductively coupled between the center conductor and the outer conductor and configured to support the center conductor within the cavity.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates a diplexer structure and associated characteristics in an implementation.

FIG. 6 illustrates diplexer structure characteristics in an implementation.

FIG. 7 illustrates diplexer structure characteristics in an implementation.

DETAILED DESCRIPTION

The examples herein discuss coaxial radio frequency (RF) elements designed for and fabricated using AM (e.g., 3D printing techniques), such as Direct Metal Laser Sintering (DMLS), that achieve desired performance across wide instantaneous bandwidth of interest for many contemporary applications. In addition, various cross-sectional profiles of the coaxial RF structures or assemblies can be achieved, such as circular, or any arbitrary cross-sectional shape without employing separate dielectric supports or spacers added for the center conductor elements. Some general advantages of coaxial lines for RF applications include wideband single transverse electromagnetic (TEM) modes operation, low loss and dispersion, dense packaging with low self-interference, and compatibility with existing RF circuit components.

To achieve manufacture of such RF elements, the examples herein include stub segments in an all-metal coaxial structure. In one example, stub segments are mated to a corresponding center conductor of a coaxial RF structure, such as a coaxial line, and these stub segments support the center conductor within a coaxial structure that forms the coaxial RF structure. The stub segments are included in coaxial stub sections that form outer walls and cavities about the stub segments. The stub segments are conductively coupled, or shorted, between outer walls (e.g., shield conductor) of the coaxial structure and the corresponding center conductors. In some examples, the stub segments comprise quarter-wave stubs formed at selected locations along the length of the center conductor, and these quarter-wave stubs themselves can comprise air-loaded circular cross-section coaxial lines running generally perpendicular to the center conductor (i.e., orthogonal to the RF power flow). Other lengths of the stub segments can be provided to establish filtering characteristics of the coaxial RF structures. Also, to allow for un-sintered (e.g., scrap) metal powder to be removed during manufacturing, escape holes are used in the outer casing forming the shield conductor of the coaxial RF structure (often referred to as release holes in surface micromachining). The size and positioning of the escape holes are selected to reduce the negative impact on stub performance including losses, reflections, and undesired radiation.

Figure 1:
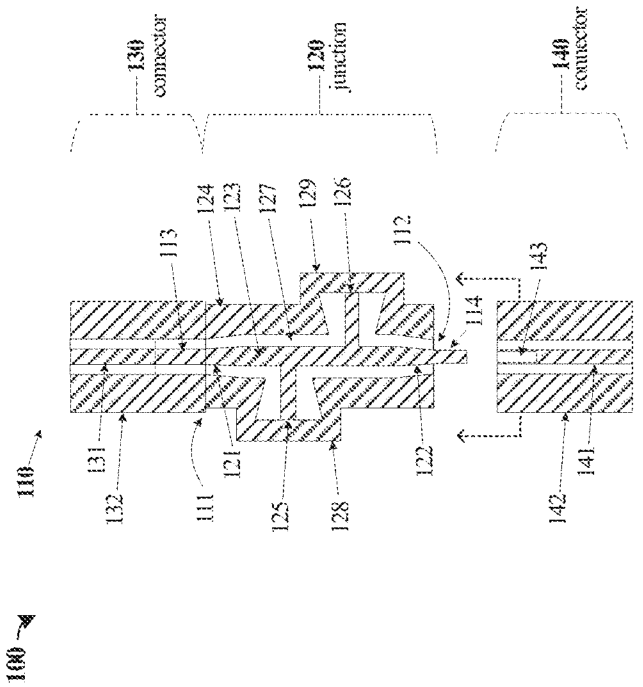
FIG. 1 illustrates a coaxial radio frequency structure in an implementation.

Turning now to example implementations, several Figures are presented. FIG. 1 includes view 100 illustrating example coaxial RF structure 110 that employs stub segments. View 100 is a cross-sectional view of coaxial RF structure 110. Coaxial RF structure 110 includes junction 120 which can join or connect two RF connectors 130 and 140, or can form a coaxial RF link or coaxial transmission line. As will be discussed herein, the general structure of junction 120 can form a basis for various types of coaxial RF structures, including different types of junctions, filters, diplexers, resonators, antenna structures, hybrid structures, and other various coaxial RF structures that have center conductors supported by stub segments shorted to outer conductors and formed in stub sections of the outer conductor.

Turning first to junction 120, this structure comprises a coaxial arrangement having two RF ports 111-112 located at axial or longitudinal ends of junction 120. Depending on selected feature sizes, these RF ports can exhibit a 50Ω nominal characteristic impedance for various frequency bands, such as K- and Ka-bands. Junction 120 includes center conductor 123 and outer conductor 124. Center conductor 123 spans axially between ports 111-112. Cavity 127 is formed within outer conductor 124 of coaxial RF structure 110 and is formed about center conductor 123. Transition segments 121-122 are portions or segments of center conductor 123 which can have a tapered diameter to transition from junction 120 to pins 113-114 that mate into connectors 130 and 140 (e.g., pin 114 mates into female connector 143 of connector 140). Thus, this example can comprise a 'male' junction 120 which mates with two 'female' connectors 130 and 140, although variations are possible. Connector 130 is shown as connected to junction 120, and connector 140 is shown as disconnected. The connectors can be 2.4 mm connectors, although variations are possible.

In addition, stub segments 125 and 126 are included which conductively span between center conductor 123 and outer conductor 124. Stub segments 125 and 126 form a structural support arrangement for center conductor 123 within cavity 127 formed by outer wall 124 to maintain positioning of center conductor 123 within cavity 127. Stub segments 125 and 126 are formed in stub transepts or housings 128 and 129, respectively, and are 'shorted' between center conductor 123 and outer conductor 124 at stub housings 128 and 129. The length of stub segments 125 and 126 can vary based on application, but in this example are provided at lengths approximate to one-quarter wavelength (λ/4), at approx. 27.5 GHZ, across the frequency range of RF signals carried by junction 120. Thus, stub segments 125 and 126 are initially formed perpendicular to center conductor 123 and are routed within stub housings 128 and 129 to make conductive contact with the outer walls of stub housings 128 and 129. Other examples herein show stub segments of various lengths and also of various routing configurations, such as folded or planar configurations routing through more than one axis.

Connectors 130 and 140 include corresponding center conductors 131 and 141, along with outer conductors 132 and 142. Connectors 130 and 140 mate with junction 120, and may comprise threaded, push-fit, friction-fit, snap-on, or other forms of connector types which carry coaxial signals to/from junction 120 on associated RF links (not shown). Flanges can be included on junction 120 to couple to other RF links or waveguides instead of connectors 130 or 140, or can be included to mount junction 120 to other structural members.

The various elements of junction 120 can be formed from a similar material and into a single workpiece using various additive manufacturing techniques, such as 3D printing, DMLS, SLA, or SLS, etc. When polymer processes are employed, metal plating is typically deposited on RF contacting surfaces to achieve the required coaxial line functionality. Also, although conventional manufacturing techniques, such as machining or casting/molding, may be employed to form certain geometries or partial assemblies requiring later joining and post-processing, the AM techniques discussed herein can advantageously concurrently form the stub segments, cavity, center conductor, and walls. Thus, center conductor 123, outer conductor 124, stub segments 125-126, stub housings 128-129, ports 111-112, and pins 113-114 can all be additively formed from the same material.

Figure 2:
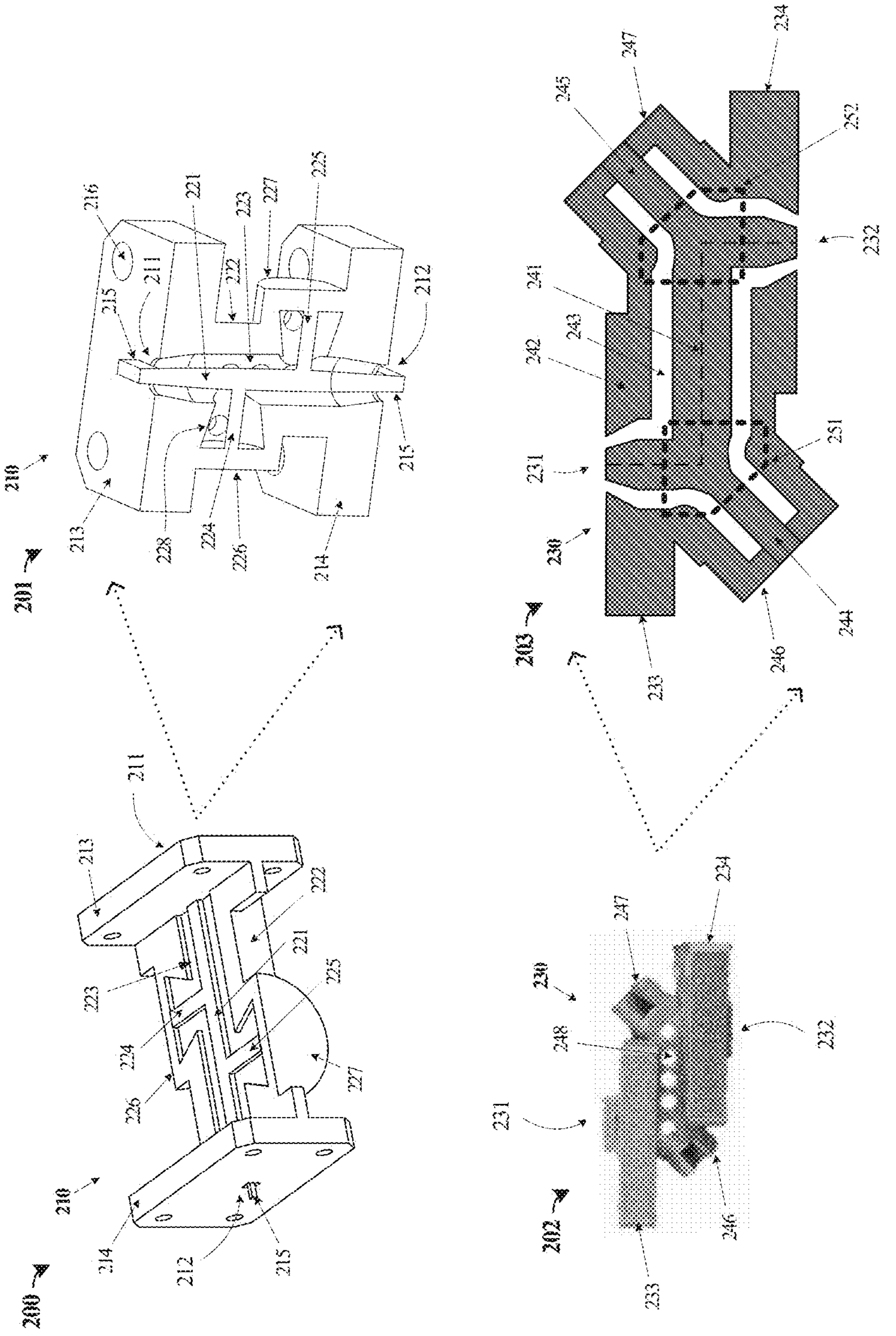
FIG. 2 illustrates coaxial radio frequency junctions in an implementation.

Turning now to further examples of coaxial RF structures with stub segments, FIG. 2 is presented. FIG. 2 includes several example implementations of different coaxial radio frequency (RF) junctions, namely T-junction 210 and Y-junction 230. RF junctions can be employed to join two RF links together, or to form a structure to which an RF cable or coaxial link can be joined to another link, or to an antenna, diplexer, filter, or other RF structure.

Turning first to T-junction 210, view 200 includes an example manufactured part formed into a single workpiece by an additive manufacturing process or technique, and view 201 includes an isometric cross-sectional view of T-junction 210. This manufactured part is shown as cut open to expose internal structures, and an actual part would have internal structures hidden from view.

T-junction 210 comprises center conductor 221 which spans axially along a longitudinal length of T-junction 210. Center conductor 221 is surrounded by outer wall or outer conductor 222, forming an air-filled coaxial cavity 223 about center conductor 221. T-junction 210 also includes flanges 213-214 which can be employed to couple T-junction 210 to other RF elements, as well as for support during manufacturing operations. Input/output ports 211-212 are also included on longitudinal ends of center conductor 221. Ports 211-212 can be further coupled to connectors or other RF elements.

Center conductor 221 is abutted by two stub segments 224-225 which extend perpendicularly from center conductor 221 to outer conductor 222 at stub housings 226-227. Stub segments 224-225 thus are oriented orthogonally to the flow of RF power through T-junction 210, which flows between ports 211-212. Stub segments 224-225 are conductively coupled (e.g., shorted) between center conductor 221 and outer conductor 222. Stub housings 226-227 each comprise corresponding walls forming coaxial cavities (joined with coaxial cavity 223) about stub segments 224-225. Stub segments 224-225 form a support arrangement for center conductor 221 within the cavity formed by outer conductor 222 to maintain positioning of center conductor 221 within cavity 223.

Detachable manufacturing supports 215 are show which result from a manufacturing process to support center conductor 221 before stub segments 224-225 are formed, and to maintain a desired positioning of center conductor 221 with respect to outer conductor 222 during manufacturing. Thus, manufacturing supports 215 will typically be removed in a post-processing step.

Further manufacturing features are included in T-junction 210, namely several escape holes 228 formed into outer conductor 222. These holes allow for removal ports for excess material resultant from a manufacturing process, such as un-sintered material or other residue or scrap material resultant from an additive manufacturing process. Holes 228 can be sized to allow for release of correspondingly sized particulate without compromising the RF performance to below a threshold level. In FIG. 1, holes 228 can be sized as 1-2 millimeters (mm), but other sizes can be employed.

Turning now to further examples of coaxial RF structures with stub segments, FIG. 2 is presented. FIG. 2 includes several example implementations of different coaxial radio frequency (RF) junctions, namely T-junction 210 and Y-junction 230. RF junctions can be employed to join two RF links together, or to form a structure to which an RF cable or coaxial link can be joined to another link, or to an antenna, diplexer, filter, or other RF structure.

Turning next to Y-junction 230, view 202 includes an example manufactured part formed into a single workpiece by an additive manufacturing process or technique, and view 203 includes a cross-sectional view of Y-junction 230. Y-junction 230 provides an offset junction between flanges 233-234, in contrast to the aligned junction of T-junction 210.

Y-junction 230 comprises center conductor 241 which spans axially along a longitudinal length of Y-junction 230. Center conductor 241 is surrounded by outer wall or outer conductor 242, forming an air-filled coaxial cavity 243 about center conductor 241. Y-junction 230 also includes flanges 233-234 which can be employed to couple Y-junction 230 to other RF elements, as well as for support during manufacturing operations. Input/output ports 231-232 are also included on longitudinal ends of center conductor 241. Ports 231-232 can be further coupled to connectors or other RF elements.

Center conductor 241 is abutted by two stub segments 244-245 which extend out from center conductor 241 to outer conductor 242 at stub housings 246-247. Stub segments 244-245 thus are oriented orthogonally to the flow of RF power through Y-junction 230, which flows between ports 231-232. Y-junction elements 251-252 are highlighted in FIG. 1 to show where stub segments 244-245 extend from center conductor 241 at a point where center conductor 241 is routed at a 90-degree angle with respect to a longitudinal axis of Y-junction 230. Stub segments 244-245 are conductively coupled (e.g., shorted) between center conductor 241 and outer conductor 242. Stub housings 246-247 each comprise corresponding walls forming coaxial cavities (joined with coaxial cavity 243) about stub segments 244-245. Stub segments 244-245 form a support arrangement for center conductor 241 within the cavity formed by outer conductor 242 to maintain positioning of center conductor 241 within cavity 243.

Further manufacturing features are included in Y-junction 230, namely several escape holes 248 formed into outer conductor 242. These holes allow for removal ports for excess material resultant from a manufacturing process, such as un-sintered material or other residue or scrap material resultant from an additive manufacturing process. Holes 248 can be sized to allow for release of correspondingly sized particulate without compromising the RF performance to below a threshold level. In FIG. 1, holes 248 can be sized as 1 millimeter (mm), but other sizes can be employed.

The various elements of T-junction 210 and Y-junction 230 can be formed from a similar material and into a single workpiece using various additive manufacturing techniques, such as 3D printing, DMLS, SLA, or SLS, etc. When polymer processes are employed, metal plating is typically deposited on RF contacting surfaces to achieve the required coaxial line functionality. Also, although conventional manufacturing techniques, such as machining or casting/molding, may be employed to form certain geometries or partial assemblies requiring later joining and post-processing, the AM techniques discussed herein can advantageously concurrently form the center conductors, outer conductors/walls, stub segments, escape holes, stubs, cavities, and flanges. Thus, center conductors, outer conductors/walls, stub segments, escape holes, stubs, cavities, and flanges can all be formed from the same material.

The stub segments discussed herein, including those discussed above for FIG. 1, comprise multi-physics elements, namely structural, mechanical, thermal, and electrical, for supporting the central conductor of a coaxial transmission line and other coaxial structures to a corresponding ground shield that allows for monolithic integration of antennas, hybrids, dividers, filters, and other components. This approach is further enhanced by additive manufacturing. The stub segment approach supports and connects a center conductor of arbitrary shape to an outer conductor of arbitrary shape via at least two λ/4 stubs (at approx. 27.5 GHZ) without any need for dielectric spacers that would otherwise be needed by other techniques, such as the PolyStrata® process. The stub segments allow for very high power through an RF structure or device by allowing associated heat to be conducted from the center conductor to the outer ground conductor and any corresponding heat sink or thermal control elements. Moreover, the stub segments facilitate 3D printing of a device in three (3) dimensions by folding and bending the coaxial structures into a compact volume, in contrast to other techniques, such as the PolyStrata® process, which is limited to a planar structure.

Figure 3:
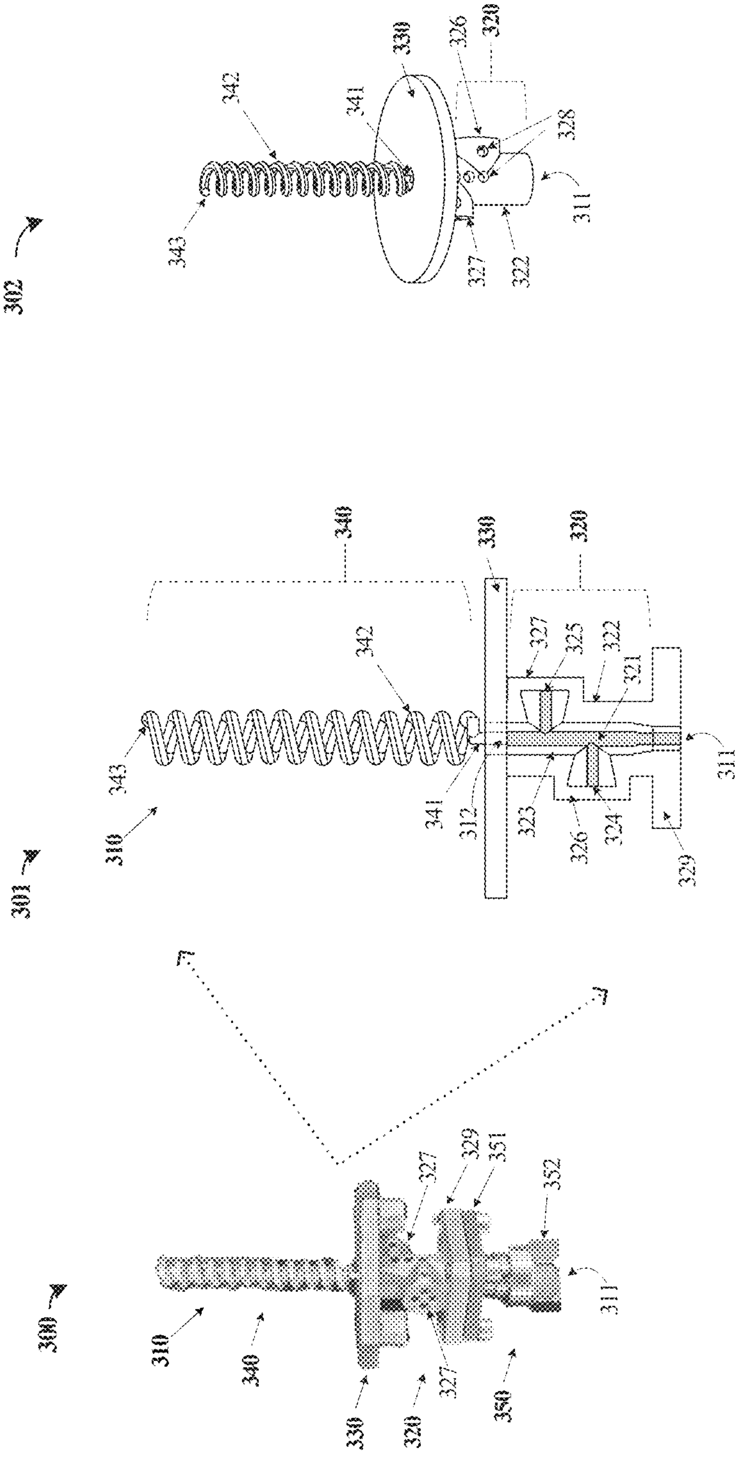
FIG. 3 illustrates an antenna structure in an implementation.

An example application of the implementations in FIGS. 1 and 2 is provided in FIG. 3. FIG. 3 includes views 300-302 each illustrating example antenna structure 310. Antenna structure 310 can employ coaxial RF structure 110 or T-junction 210 and Y-junction 230 as a part of the integral structure, although any of the coaxial structures discussed herein can instead be employed. Antenna structure 310 can be referred to as a 3D printed helical antenna which can be monolithically integrated and fed by an air-loaded coaxial line. View 300 shows a manufactured version of antenna structure 310 made using a 3D printing, DMLS, SLA, or SLS process with a selected material. View 301 shows a cross-sectional view of antenna structure 310. View 302 shows an isometric view of antenna structure 310.

View 300 includes an example manufactured part (320, 330, and 340) formed into a single workpiece by an additive manufacturing process or technique. Connector structure 350 can optionally be coupled to the structure including elements 320, 330, and 340, as shown in view 300, but omitted from views 301 and 302. In view 300, antenna element 340 is coupled through baseplate 330 to a center conductor of T-junction 320, and this center conductor of T-junction 320 is coupled to a center conductor of connector structure 350 which couples to an RF link (not shown) with connector 352 (e.g., 2.4 mm connector). The outer conductor or shield conductor is coupled to the outer walls and bodies of connector structure 350, T-junction 320, and baseplate 330. Flanges 351 and 329 can couple together to hold connector structure 350 to T-Junction 320. Antenna element 340 can be energized by RF energy to transmit this RF energy, or receive RF energy for transfer over an associated RF link. Connector structure 350 can comprise a SMA or N-type connector, among other types.

View 301 is a cross-sectional view highlighting internal components of antenna structure 310. Antenna element 340 comprises helical member 342 having distal end 343 and proximal end 341. Baseplate 330 comprises a plate member which has an aperture or hole through which proximal end 341 couples to center conductor 321 of T-junction 320. T-junction 320 comprises center conductor 321 which spans axially along a longitudinal length of T-junction 320. Center conductor 321 is surrounded by outer wall or outer conductor 322, forming an air-filled coaxial cavity 323 about center conductor 321. T-junction 320 also includes flange 329 which can be employed to couple T-junction 320 to other RF elements, as well as for support during manufacturing operations. Input/output ports 311-312 are also included on longitudinal ends of center conductor 321. Ports 311-312 can be further coupled (such as shown) to connectors, antennas, or other RF elements.

Center conductor 321 is abutted by two stub segments 324-325 which extend out from center conductor 321 to outer conductor 322 at stub housings 326-327. Stub segments 324-325 thus are oriented orthogonally to the flow of RF power through T-junction 320, which flows between ports 211-212. Stub segments 324-325 are conductively coupled (e.g., shorted) between center conductor 321 and outer conductor 322. Stub housings 326-327 each comprise corresponding walls forming coaxial cavities (joined with coaxial cavity 323) about stub segments 324-325. Stub segments 324-325 form a support arrangement for center conductor 321 within the cavity formed by outer conductor 322 to maintain positioning of center conductor 321 within cavity 323.

View 302 is an isometric solid view of antenna structure 310, showing several manufacturing features. Manufacturing features included in T-junction 320 include several escape holes 328 formed into outer conductor 322. These holes allow for removal ports for excess material resultant from a manufacturing process, such as un-sintered material or other residue or scrap material resultant from an additive manufacturing process. Holes 328 can be sized to allow for release of correspondingly sized particulate without compromising the RF performance to below a threshold level.

Various elements of antenna structure 310 can be formed from a similar material and into a single workpiece using various additive manufacturing techniques, such as 3D printing, DMLS, SLA, or SLS, etc. When polymer processes are employed, metal plating is typically deposited on RF contacting surfaces to achieve the required coaxial line functionality. Also, although conventional manufacturing techniques, such as machining or casting/molding, may be employed to form certain geometries or partial assemblies requiring later joining and post-processing, the AM techniques discussed herein can advantageously concurrently form the center conductors, outer conductors/walls, stub segments, escape holes, stubs, cavities, flanges, baseplates, and helical antenna elements. Thus, center conductors, outer conductors/walls, stub segments, escape holes, stubs, cavities, flanges, baseplates, and helical antenna elements can all be formed from the same material. Advantageously, antenna structure 310 can provide for monolithic construction of a helical antenna structure which includes a coaxial feed (T-junction 320) and baseplate. The coaxial feed might comprise various integrated filtering elements discussed below.

In one example implementation of antenna structure 310, specific dimensioning and configurations can be employed, such as for operation over the K- and Ka-bands. For example, the diameter of the ground plane formed by baseplate 330 can be at least $3\lambda/4$. Also, the ground plane could be shaped in the form of a cylindrical cavity, and a radome might be coupled over portions of antenna structure 310. The geometrical configuration of helical member 342 usually consists of N turns with diameter D, and spacing S between each turn, with a conductor diameter of helical member 342 of 0.85 mm. In this example, the number of turns comprises 12, with a 3 mm diameter, 1.87 mm spacing, and 9.6 mm turn length. The total length of helical member 342 is L=NS, which can be 24 mm in this example. The total length of the wire forming helical member 342 is $L_n=N\sqrt{S2+C2}$, where C is the circumference of the helix ($C=\pi D$). The selected C in this example is 9.42 mm. Another parameter is the pitch angle $\alpha$, which is the angle formed by a line tangent to the helix and a plane perpendicular to the helix axis; $\alpha=\tan^{-1} S/\pi D$. The pitch angle in this example can comprise a value between 11° and 12°, such as $\alpha=11.23°$. The radiation characteristics of antenna structure 310 can be varied by controlling the size of the corresponding geometrical properties compared to the RF wavelength. Input impedance depends upon the pitch angle and the size of the conductor forming helical member 342, especially near proximal end 341. The general polarization of helical member 342 is elliptical.

In addition to coaxial junctions that employ the stub segments, the stub segments themselves can be designed to establish filtering properties for a coaxial structure. Specifically, the stub segments and associated RF structures can be employed as diplexers, filters, and resonators, among other RF components. In filter components, the selection of coaxial line parameters such as lengths and impedances can provide high-pass or low-pass configurations. These filter configurations, as well as various junctions, diplexers, and resonator designs enabled by stub segments are discussed in the examples below.

FIG. 4 includes view 400, schematic 401, and table 402 which illustrate example diplex/filter structures formed using techniques discussed herein, which include use of stub segments. Diplexer structure 410 is shown in view 400, which can be configured to operate over frequency ranges including 4-7.8 GHz and 7.8-15 GHz, among others. Diplexer structure 410 can comprise a monolithic structure, additively manufactured according to the various techniques discussed herein, such as additively manufactured using SLA and coated with copper material. The use of stub segments in diplexer structure 410 provides not only for a monolithic and supported central conductor in a coaxial structure, but also provides for various impedance annulling and filtering features with three-dimensional folding techniques that form a compact packaging arrangement.

Diplexer structure 410 includes flanges on axial ends (also referred to as longitudinal ends), namely flanges 414-415. Flanges 414-415 can couple to a baseplate/antenna structure discussed in FIG. 3, or to various RF links, RF structures, or other RF elements. In this example, a merged or combined port 411 is established at flange 413 and is coupled to combined coaxial section 416. Combined coaxial section 416 branches into two branch coaxial sections 421 and 431, which establish branch ports A and B, respectively, at flange 415 (branch port A hidden from view). Additionally, several stub sections (422, 423, 424, 432, 433, and 434) are included along the length of combined coaxial section 416 and branch coaxial sections 421 and 431 which establish impedance annulling network features and filtering features for RF signals carried by diplexer structure 410. Impedance annulling network 440 is shown in view 400, as well as low-band filter 420 and high-band filter 430. Escape holes 418 are included throughout diplexer structure 410 to provide for removal of excess material or unhindered material.

First branch coaxial section 421 is shown branching from combined coaxial section 416 at a Y connection, which is discussed in more detail in FIG. 7. Branch coaxial section 421 also includes stub section 422 which is a part of impedance annulling network 440, and then stub sections 423 and 424 which are a part of low-band filter 420. Second branch coaxial section 431 is shown branching from combined coaxial section 416 at a Y connection. Branch coaxial section 431 also includes stub section 432 which is a part of impedance annulling network 440, and then stub sections 433 and 434 which are a part of high-band filter 430. Schematic view 401 illustrates various connections and impedances of the various elements in impedance annulling network 440, low-band filter 420, and high-band filter 430. Furthermore, table 402 shows example impedance values selected for each of the impedance elements shown in schematic view 401, listed in ohms (Ω).

The various elements of diplexer structure 410 can be formed from a similar material and into a single workpiece using various additive manufacturing techniques, such as 3D printing, DMLS, SLA, or SLS, etc. When polymer processes are employed, metal plating is typically deposited on RF contacting surfaces to achieve the required coaxial line functionality. Also, although conventional manufacturing techniques, such as machining or casting/molding, may be employed to form certain geometries or partial assemblies requiring later joining and post-processing, the AM techniques discussed herein can advantageously concurrently form the flanges, combined/branch sections, stub sections and internal stub segments, cavities, center conductors, escape holes, and walls.

Stub sections 422, 423, 424, 432, 433, and 434 provide not only for support of the center conductor of each coaxial section among coaxial sections 416, 421, and 431, but also filtering and impedance annulling/matching operations for signals carried by such central conductors. Geometries of coaxial sections 416, 421, and 431, including the corresponding center conductors, cavity diameters, and stub sections, can be tuned to exhibit desired RF properties over a range of desired frequencies. Impedance annulling can be employed to prevent substantial interaction among the branches. In operation, signals having different properties, such as frequency, can be carried by the individual coaxial lines and combined or separated at combined coaxial section 416.

Figure 5:
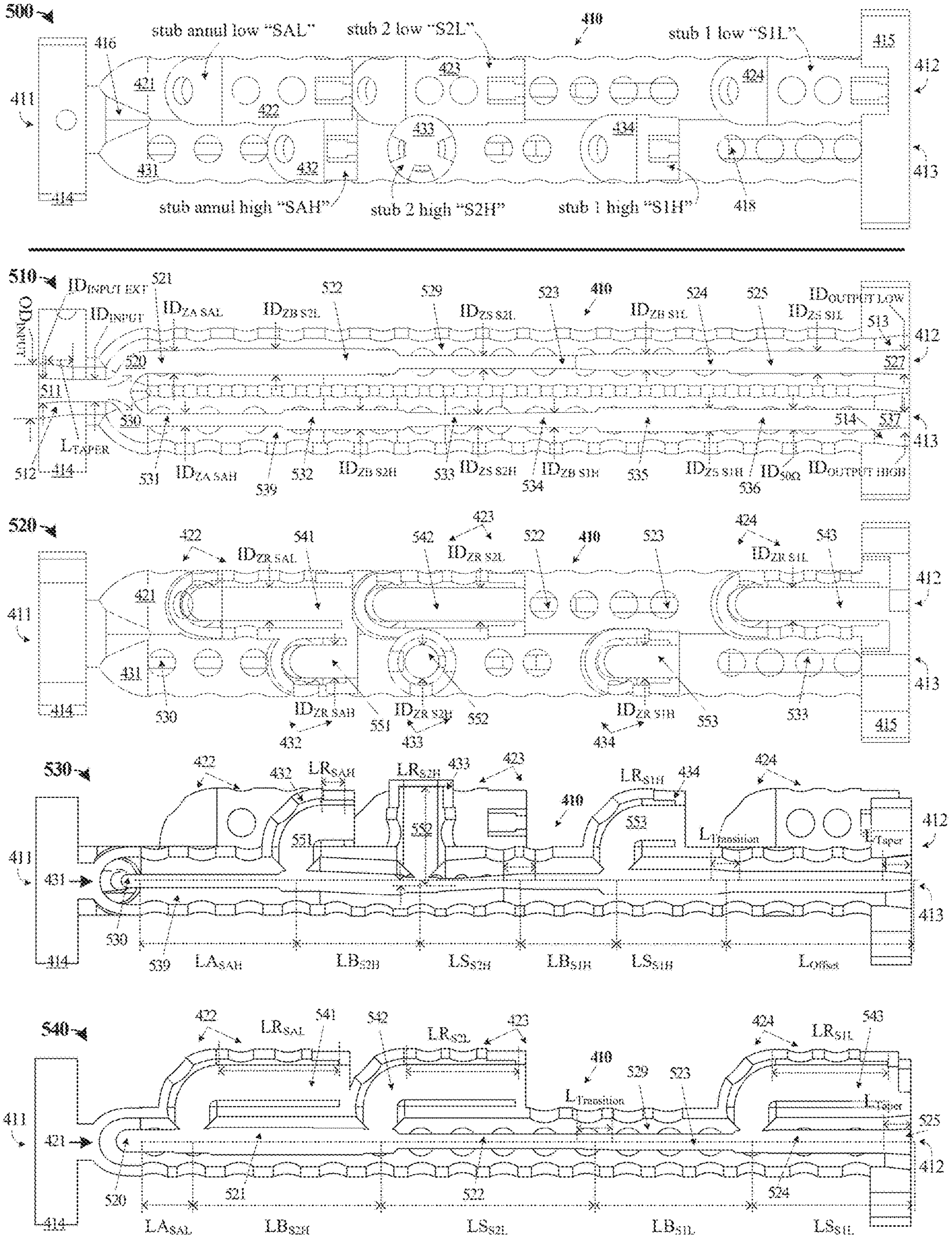
FIG. 5 illustrates a diplexer structure and associated characteristics in an implementation.

FIG. 5 includes further views 500, 510, 520, and 530 of diplexer structure 410, with cross-sectional views and various geometries and sections labeled for clarity. In view 500, diplexer structure 410 is shown in a top view with branches 420 and 430 visible having associated stub sections 422, 423, 424, 432, 433, and 434. In this example, several functional labels are included for the various stub sections, namely stub section 422 as "stub annulling low (SAL)," stub section 423 as "stub 2 low (S2L)," stub section 424 as "stub 1 low (S1L)," stub section 432 as "stub annulling high (SAH)," stub section 433 as "stub 2 high (S2H)," and section 434 as "stub 1 high (S1H)." Corresponding labeling/nomenclature is found throughout FIGS. 4-7.

The compact arrangement of diplexer structure 410 is enabled by the foldable or routable nature of the stub sections, providing for planar or multi-dimensional routing of the filtering/stub elements. For example, the architecture of diplexer structure 410 includes two 2-stub filters constructed from λ/4 segments at selected low band and high band center frequencies. The addition of 90-degree stub bends on stub sections 422, 423, 424, 432, and 434 provides for a more compact arrangement to allow for desired filtering responses. In some cases, these bends can add additional reactive loading to the stubs, which can lead to degraded RF performance at selected frequency ranges. The branch coaxial sections and stub sections of the low-band filter branch (low-band filter 420) are λ/4 in length (shown in FIGS. 4-7 at a center frequency of 11.59 GHz), and the branch coaxial sections and stub sections of the high-band filter branch (high-band filter 430) are λ/4 in length (shown in FIGS. 4-7 at a center frequency of 5.85 GHz). Impedance annulling network 440 features an asymmetric pair of stub sections 422 and 432 acting as impedance tuners. Impedance annulling network 440 includes a low band series line (e.g., 421) of a λ/4 length at high band, followed by stub section 422 of a λ/4 length at low band ($Z_{AL}$ and $Z_{RL}$). Impedance annulling network 440 includes a high band series line (e.g., 431) of a λ/4 length at low band followed stub section 432 of a λ/4 at high band ($Z_{AH}$ and $Z_{RH}$).

Views 510, 520, 530, and 540 illustrate various dimensioning of the different portions of diplexer structure 410, which includes internal center conductor diameters, flange properties, coaxial line properties, stub section and stub segment properties, and other various elements. Table 600 and parameters 610 in FIG. 6 include example dimensions which can be used for form diplexer structure 410, although variations are possible depending on desired application, frequency ranges, filtering performance, material selection, and other factors. The parameterized lengths in parameters 610 indicate example dimensions derived on several baseline length selections. Stub section lengths are measured along a centerline from the center of the main (straight) coaxial branch sections. Parameterized/derived straight section stub lengths have the coax outer diameter (OD), material thickness ($T_{mat}$), and the arc length of the bend subtracted.

View 510 shows a top-view cross-sectional view, similar to the top view in view 500. Internal features of diplexer structure 410 are shown. These include combined center conductor 511 surrounded by coaxial cavity 512 and flange 414. Combined center conductor 511 is split into branch center conductors 520 and 530 which have corresponding dimensioning, tapers, transitions, and the like. For example, branch center conductor 520 includes portions 521, 522, 532, 524, 525, and 527 which are surrounded by branch cavity 529, and have several stub center conductors (541, 542, and 543) further branched therefrom. Branch center conductor 530 includes portions 531, 532, 532, 535, 536, and 537 which are surrounded by branch cavity 539, and have several stub center conductors (555, 552, and 553) further branched therefrom.

View 520 shows a partial cross-sectional view highlighting internal features of stub sections of diplexer structure 410. Specifically, for branch coaxial section 421, stub section 422 includes stub center conductor 541, stub section 423 includes stub center conductor 542, and stub section 424 includes stub center conductor 543. For branch coaxial section 431, stub section 432 includes stub center conductor 551, stub section 433 includes stub center conductor 552, and stub section 434 includes stub center conductor 553. The stub center conductors can be referred to as stub segments which are located within stub sections each having a coaxial configuration and corresponding cavity surrounding the stub center conductors.

View 530 shows a cross-sectional view highlighting branch coaxial section 431. branch coaxial section includes several corresponding diameter changes, as noted in view 510. However, view 530 also shows features of stub sections 432, 433, and 434 which include corresponding stub center conductors 551, 552, and 553 which branch from branch center conductor 530 of branch coaxial section 431. As can be seen, these stub center conductors 551, 552, and 553 are conductively coupled (e.g., shorted) between branch center conductor 530 and end portions of the outer walls of the corresponding stub sections 432, 433, and 434. Also, a transition feature is included between each stub center conductor and branch center conductor 530, namely a transition from a first thickness/diameter at branch center conductor 530 to a second thickness/diameter of the stub center conductors.

View 540 shows a cross-sectional view highlighting branch coaxial section 421. branch coaxial section includes several corresponding diameter changes, as noted in view 510. However, view 540 also shows features of stub sections 422, 423, and 424 which include corresponding stub center conductors 541, 542, and 543 which branch from branch center conductor 520 of branch coaxial section 421. As can be seen, these stub center conductors 541, 542, and 543 are conductively coupled (e.g., shorted) between branch center conductor 520 and end portions of the outer walls of the corresponding stub sections 422, 423, and 424. Also, a transition feature is included between each stub center conductor and branch center conductor 520, namely a transition from a first thickness/diameter at branch center conductor 520 to a second thickness/diameter of the stub center conductors.

FIG. 7 shows detailed views and example characteristics for portions of impedance annulling network 440 of diplexer structure 410. View 700 includes similar features as shown in FIGS. 4-6, as well as additional internal features of combined center conductor 711, combined cavity 712, first branch center conductor 721, first branch outer wall 722, first branch cavity 734, second branch center conductor 731, second branch outer conductor 732, and second branch cavity 735.

The dimensions used to form the portion of diplexer structure 410 in view 700 have baseline geometric parameters listed in view 720, while view 730 includes formulae for deriving actual geometric dimensions. The primary bend junction is constructed from sweeping circular profiles for the outer conductors 722/732 and inner conductors 721/731 along paths formed from tangentially continuous circular arcs 751/752, such that the outputs are evenly spaced, with one (1) material thickness ($T_{mat}$) between them, and such that the bend radius is equal to the coax exterior radius 'OD/2'. The exterior wall is maintained at an outer diameter of OD, while the inner conductors are tapered from the input ID to their respective $ID_{Z4}$ values. The draft angle '∠' is calculated based on the path length of the circular arcs and the radius difference.

Figure 8:
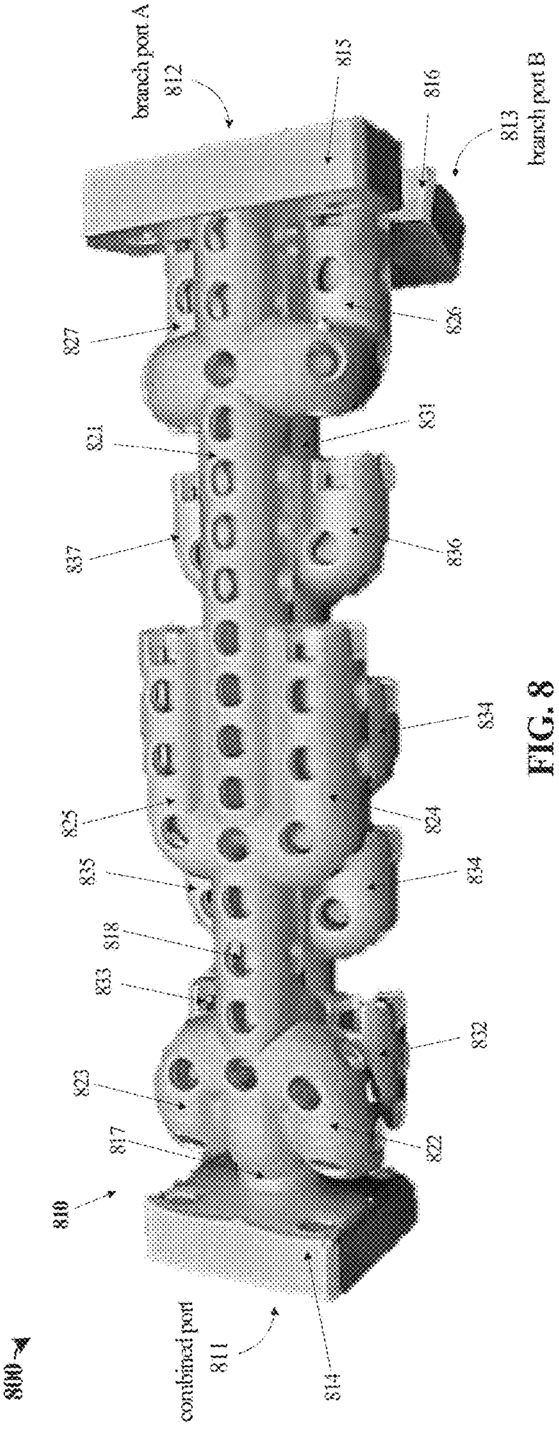
FIG. 8 illustrates a diplexer structure in an implementation.

FIG. 8 illustrates another example diplexer structure in an implementation. View 800 shows "packed" diplexer structure 810. Diplexer structure 810 is formed from two parallel branch coaxial lines 821 and 831 having separate flanges 815 and 816 that establish branch ports 812 and 813. Branch coaxial lines 821 and 831 merge into a combined coaxal line 817 which has combined port 811 at flange 814. Flanges 814-816 can be coupled to further RF elements, such as RF links, antennas, filters, further diplexers, resonators, or other RF structures. Various stub sections 822-827 are included on branch coaxial line 821, and stub sections 832837 are included on branch coaxial line 831.

Figure 11:
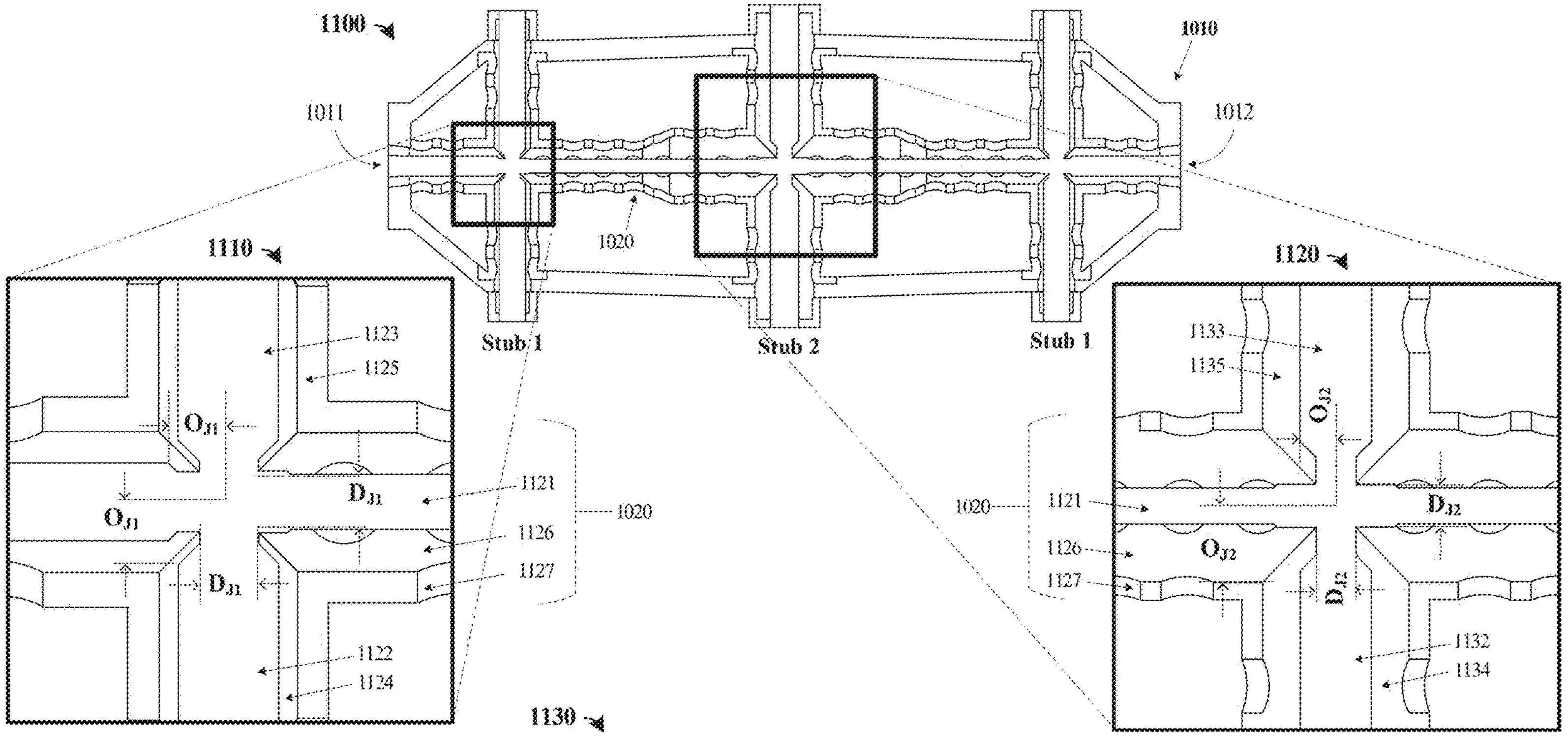
FIG. 11 illustrates filter structure characteristics in an implementation.

Diplexer structure 810 shows an alternate implementation of diplexer structure 410. Stub sections are mirrored across from corresponding ones on each branch coaxial line, and provide filtering for RF signals carried across the associated branch coaxial line. Joints are formed on the center conductor for each branch coaxial line, and these joints comprise mitered coaxial cross-junction arrangements. Example mitered coaxial cross-junction arrangements are shown in FIG. 11 for filter structure 1010, and similar techniques and dimensioning can apply. Moreover, the stub sections are folded in more than one dimensional plane/axis to lie parallel to the longitudinal axis of each branch coaxial line. In this manner, a compact arrangement is formed for diplexer structure 810. Diplexer structure 810 can comprises monolithic structure, printed using SLA and coated with copper material. Diplexer structure 810 can be formed using any of the aforementioned techniques, with escape holes 818 included for removal of excess material from internal RF cavities.

Figure 9:
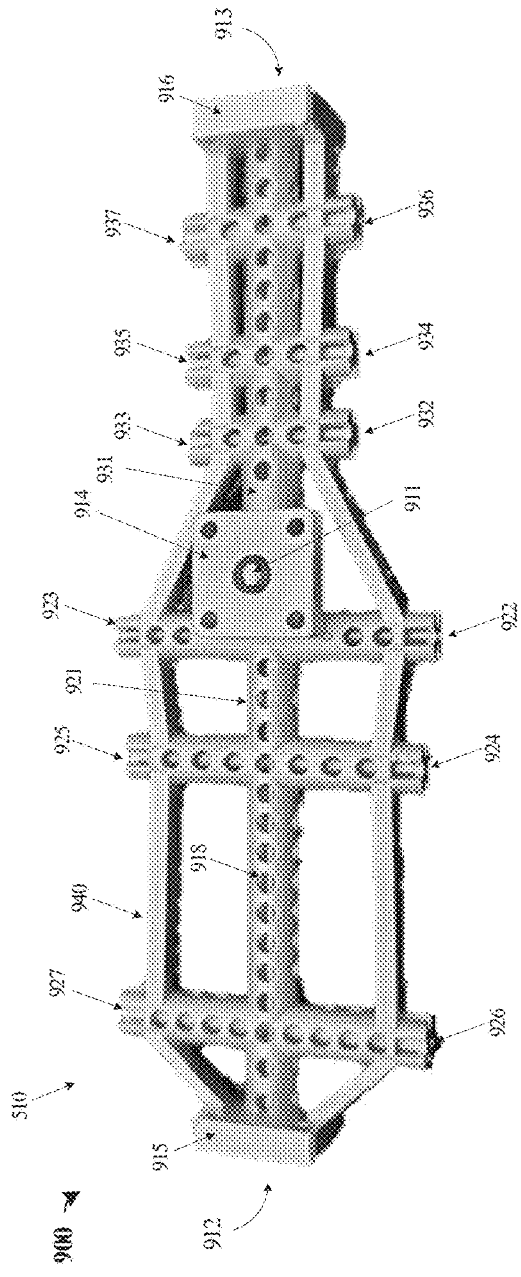
FIG. 9 illustrates a diplexer structure in an implementation.

FIG. 9 illustrates another example diplexer structure in an implementation. FIG. 9 includes view 900 which illustrates example diplexer structure 910 formed using techniques discussed herein with regard to stub sections. Diplexer structure 910 comprises a flat or planar filter structure having filtering characteristics provided by stub sections 922-927 and 932-937. The use of the stub sections provides not only for a coaxial structure, but also for various filtering features and planar packaging techniques to form a compact arrangement. Structural webbing 940 is also optionally included to mechanically reinforce various stub sections. Also visible in view 900 is a central conductor of port 911.

Diplexer structure 910 includes a combined coaxial line (hidden) extending from flange 911, which then branches into low band branch coaxial line 921 and high branch coaxial line 931. Branch coaxial line 921 includes stub sections 922-927 and extends to flange 915 which provides port 912. Branch coaxial link 931 includes stub sections 932-937 and extends to flange 916 which provides port 913. As with the examples above, the filtering and/or impedance annulling features of stub sections 922-927 and 932-937 and corresponding coaxial lines can be established based on dimensional properties or geometric configurations among such elements. The planar configuration of FIG. 9 has combined port 911 positioned approximately at a midpoint along a longitudinal axis of the entire coaxial RF structure and combined port 911 oriented perpendicular to the longitudinal axis. Branch ports 912-913 are positioned at opposing axial ends of the entire coaxial RF structure.

Diplexer structure 910 shows an alternate implementation of diplexer structure 410. Stub sections are mirrored across from corresponding ones on each branch coaxial line, and provide filtering for RF signals carried across the associated branch coaxial line. Joints are formed on the center conductor for each branch coaxial line, and these joints comprise mitered coaxial cross-junction arrangements. Example mitered coaxial cross-junction arrangements are shown in FIG. 11 for diplexer structure 1010, and similar techniques and dimensioning can apply. Diplexer structure 910 can comprise a monolithic structure, printed using SLA and coated with copper material. Diplexer structure 910 can be formed using any of the aforementioned techniques, with escape holes 918 included for removal of excess material from internal RF cavities.

Figure 10:
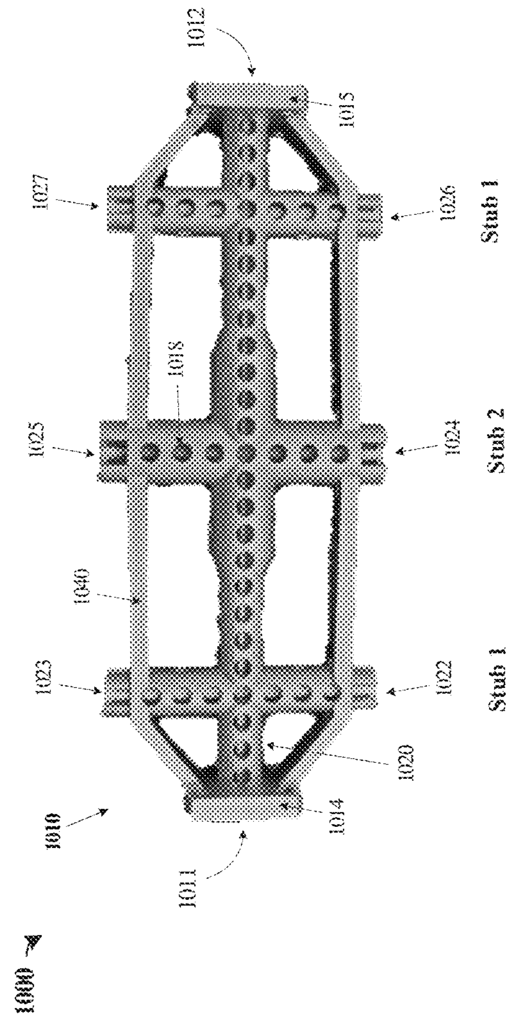
FIG. 10 illustrates a filter structure in an implementation.

FIG. 10 includes view 1000 which illustrates example filter structure 1010. Filter structure 1010 comprises a flat or planar filter arrangement having filtering characteristics provided by stub sections 1022-1027. In this example, filter structure 1010 comprises a low band (4-7.8 GHZ) 3-stub filter, which can provide filtering performance of −13 dB over a frequency range of 4.14 GHz to 7.81 GHz. Filter structure 1010 includes first flange 1014 that provides first port 1011 and second flange 1015 that provides second port 1012. Coaxial line 1020 extends along a longitudinal axis between flanges 1014 and 1015, and includes several diameter/thickness variations according to the filtering and impedance characteristics desired for filter structure 1010.

Filter structure 1010 can comprise a monolithic structure, printed using SLA and coated with copper material, with escape holes 1018 included for removal of material from the coaxial cavity formed about a center conductor of coaxial line 1020 (and similar for stub sections 1022-1027). The use of the stub segments provides not only for a coaxial structure, but also for various filtering features and a planar configuration to form a compact packaging arrangement. Structural webbing 1040 is also optionally included to mechanically reinforce various stub sections 1022-1027.

Stub sections 1022-1027 are mirrored across coaxial line 1020, and provide filtering for RF signals carried across coaxial line 1020. Joints are formed on the center conductor for coaxial line 1020, and these joints comprise mitered coaxial cross-junction arrangements. Example mitered coaxial cross-junction arrangements are shown in FIG. 11 for diplexer structure 1010. Stub sections 1022-1027 have been divided into sizes or categories in FIG. 10, namely stub 1 and stub 2 categories. These correspond to stub sections 1022, 1023, 1026, and 1027 categorized as “stub 1” and sharing similar geometric properties and dimensional characteristics, and stub sections 1024 and 1025 categorized as “stub 2” and sharing similar geometric properties and dimensional characteristics. Variations on these categories and the corresponding geometric properties and dimensional characteristics can be included in different implementations and examples. The geometric properties of coaxial line 1020 and stub sections 1022-1027 can vary according to the transmission and filtering characteristics desired, among other considerations discussed in FIGS. 11-12.

FIG. 11 illustrates various characteristics of filter structure 1010. View 1100 is a cross-sectional view illustrating the bottom portion of filter structure 1010, with two detailed views 1110 and 1120 highlighting the mitered coaxial cross-junction arrangements of the stub sections. View 1110 shows dimensional details for stub 1 (e.g., stub sections 1022, 1023, 1026, and 1027), and includes coaxial center (inner) conductor 1121 of coaxial line 1020, coaxial cavity 1126, coaxial outer wall 1127, lower stub segment 1122, upper stub segment 1123, lower stub cavity 1124, upper stub cavity 1125. View 1120 shows dimensional details for stub 2 (e.g., stub sections 1024 and 1025), and includes coaxial center (inner) conductor 1121 of coaxial line 1020, coaxial cavity 1126, coaxial outer wall 1127, lower stub segment 1132, upper stub segment 1133, lower stub cavity 1134, upper stub cavity 1135.

Figure 12:
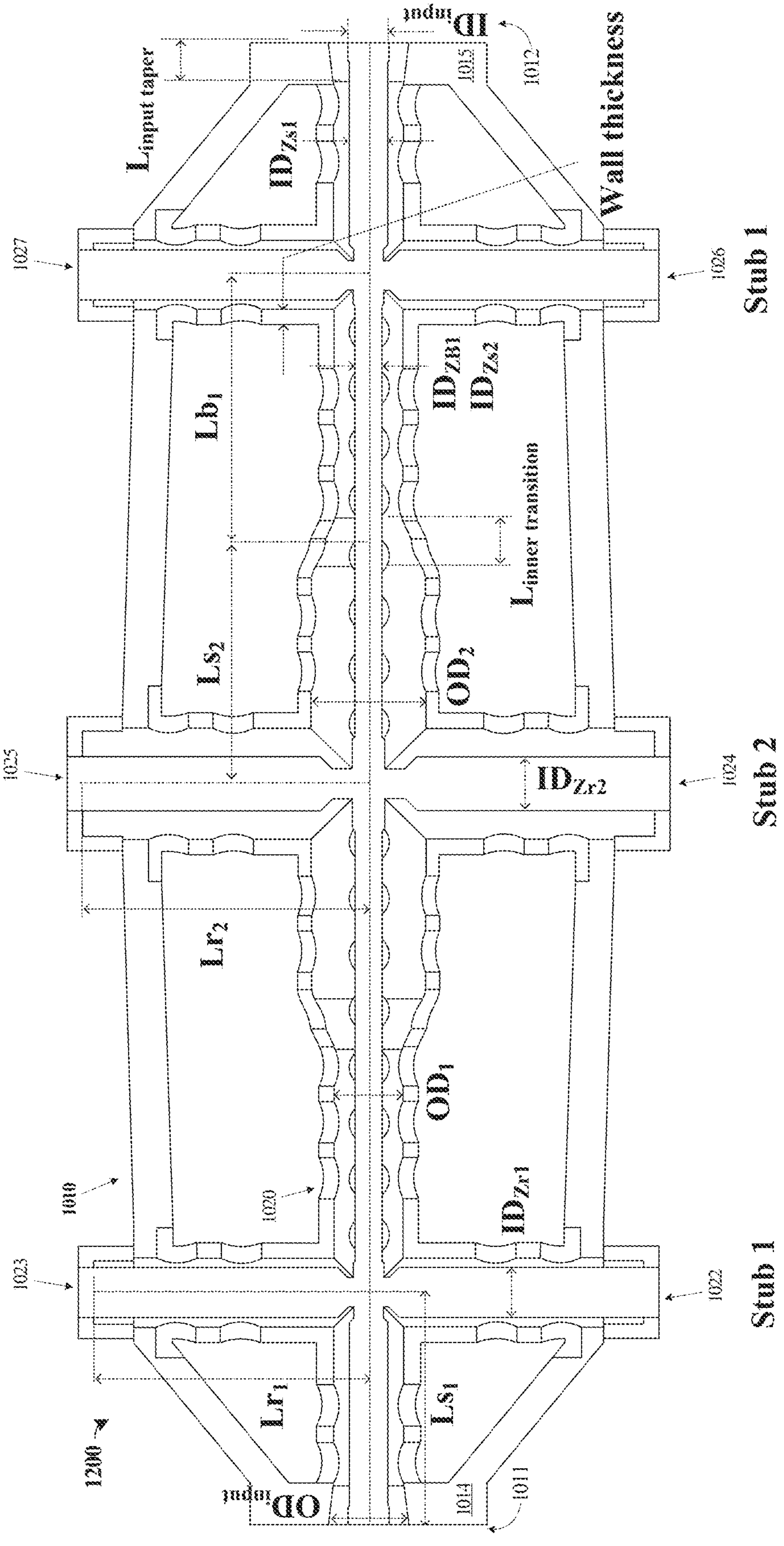
FIG. 12 illustrates filter structure characteristics in an implementation.

FIG. 12 illustrates another view of filter structure 1010. View 1200 is a cross-sectional view illustrating the bottom portion of filter structure 1010. View 1200 shows dimensional details for main coaxial link 1020, input/output flanges 1014-1015, stub sections 1022-1027, coaxial center (inner) conductor 1121 of coaxial line 1020, coaxial cavity 1126, coaxial outer wall 1127, lower stub segment 1122, upper stub segment 1123, lower stub cavity 1124, upper stub cavity 1125, lower stub segment 1132, upper stub segment 1133, lower stub cavity 1134, upper stub cavity 1135.

Table 1130 illustrates examples of the various dimensioning and characteristic impedances of the portions of filter structure 1010 which apply to the examples in FIGS. 10-12. Table 1103 includes center conductor diameters, cavity dimensional properties, outer wall properties, stub section and stub segment properties, input/output diameters, and other various elements. For the mitered coaxial cross-junctions, the upper and lower stub sections and segments are of the same impedance, with left and right lines as unique impedances. The conductor lines taper to a constant junction diameter (D), starting from a set distance from the junction center, the junction offset (O). Table 1130 illustrates one example implementation, and the corresponding dimensions and characteristic impedances can vary depending on desired application, frequency ranges, filtering performance, material selection, and other factors.

Figure 13:
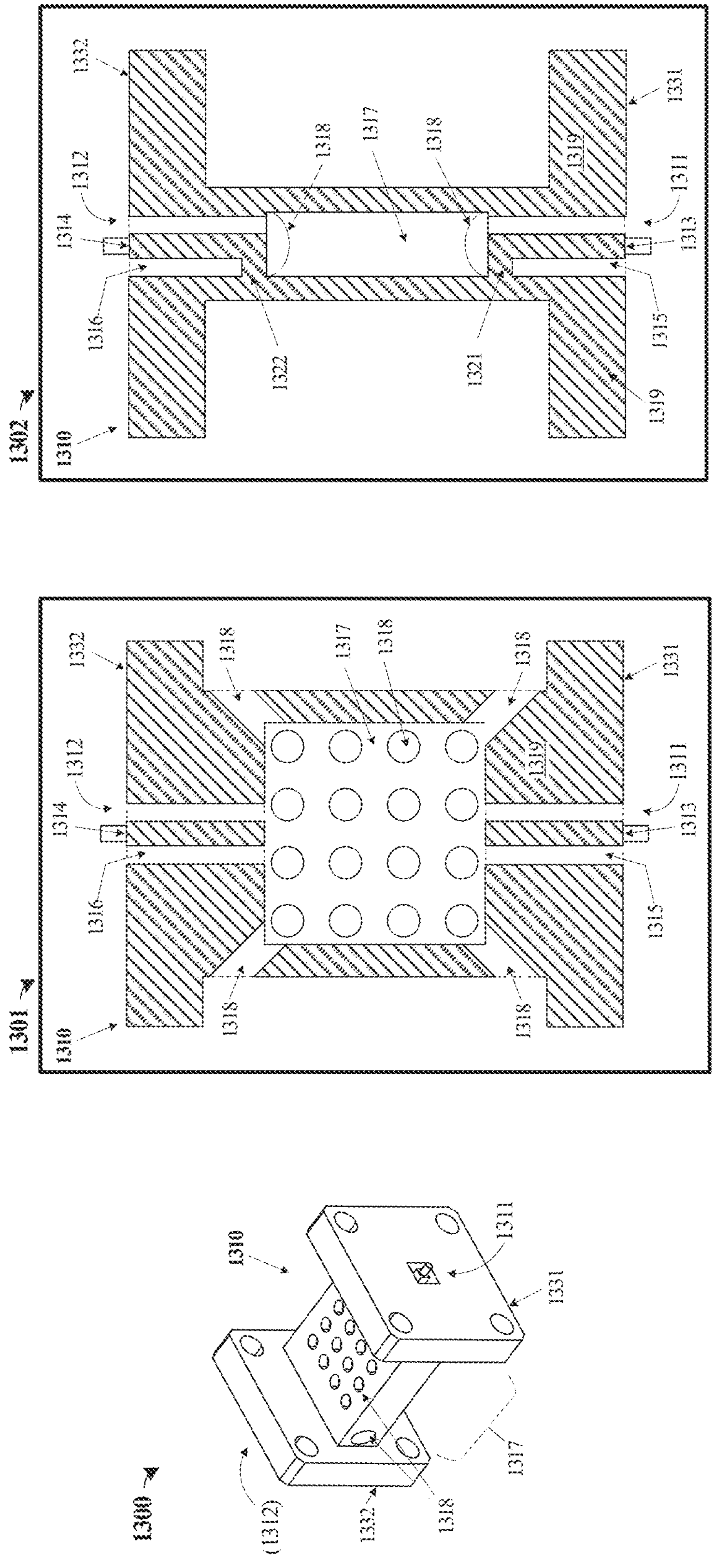
FIG. 13 illustrates a resonator structure in an implementation.

FIG. 13 includes views 1300-1302 which illustrate example resonator structure 1310. View 1300 shows an isometric exterior view of resonator structure 1310. View 1301 is a top-down cross-sectional view of the interior of resonator structure 1310, sectioned at a midpoint of resonator cavity 1317. View 1302 is a side cross-sectional view of the interior of resonator structure 1310, sectioned at a midpoint of feed ports 1311-1312.

Resonator structure 1310 comprises a flat or planar resonator cavity abutted by flanges 1331-1332 that house feed ports 1311-1312. Resonator structure 1310 comprises monolithic body 1319 which forms resonator cavity 1317 fed by coaxial ports 1311-1312. Ports 1311-1312 have center conductors 1313-1314 and coaxial air cavities 1315-1316. Center conductors 1313-1314 are supported by stub segments 1321-1322, which contact both the corresponding center conductor and the outer walls of resonator cavity 1317.

Resonator structure 1310 can comprise a monolithic structure, manufactured using DMLS or SLA and coated with copper material. Resonator structure 1310 can be formed using any of the aforementioned techniques, with escape holes 1318 included for removal of excess material from internal RF cavities.

Resonator cavity 1317 has interior dimensions which can vary based on application, frequency range, materials, performance requirements, and the like. In this example implementation, resonator cavity 1317 includes width=6.9 mm and height=2 mm, with sixteen (16) escape/release holes on top and bottom, along with an elliptical escape hole in each corner. The diameter of feed ports 1311-1312 (e.g., outer diameter of cavities 1315-1316)=1.9 mm. The diameter of the center conductor of feed ports 1311-1312 is =0.75 mm. The length of the feed (center conductors 1313-1314) to resonator cavity 1317=4 mm. The diameter of escape holes 1318=1 mm. Feed ports 1311-1312 terminate in an electrical 'short' (stub segments 1321-1322) flush with the cavity wall of resonator cavity 1317. With the configuration shown in FIG. 13, an expected $Q_0$ (including 10 μm roughness) is 1165, with radiation less than-37 dB (relative to incident power), and a second resonance near 48 GHz. The expected bandwidth is 29.66-29.99 GHz with $f_0$=28.9 GHZ.

Figure 14:
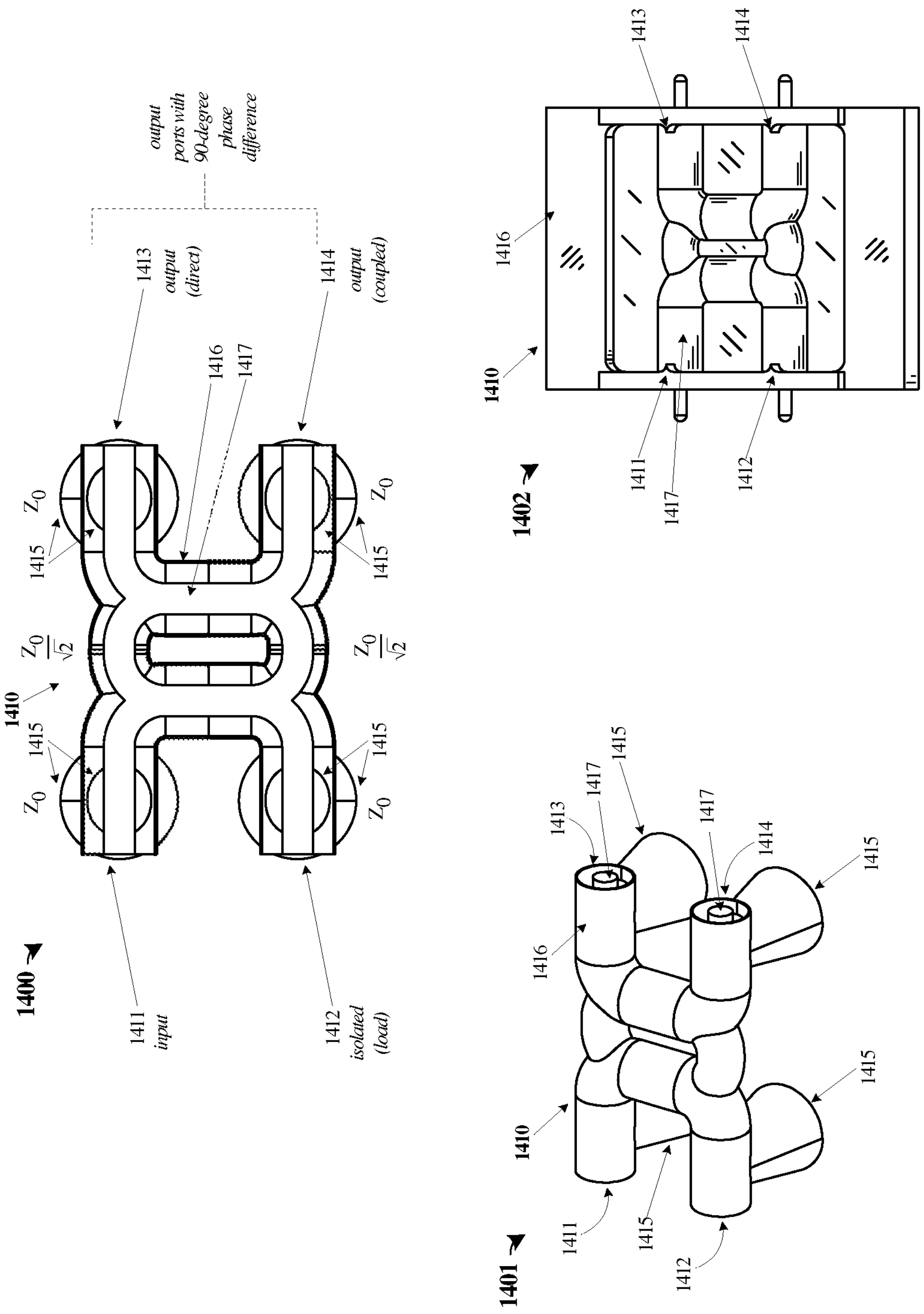
FIG. 14 illustrates a 90-degree hybrid structure in an implementation.

FIG. 14 includes views 1400-1402 which illustrate example 90-degree RF hybrid structure 1410 formed using techniques discussed herein with regard to stub segments and monolithic manufacturing. Hybrid structure 1410 comprises a 90-degree hybrid coupler which is a four-port device configured to equally split an input RF signal into two paths with a 90-degree phase shift between them or combine two RF signals while maintaining high isolation between them.

Hybrid structure 1410 includes cavity walls 1416 which includes four ports 1411-1414. Each of ports 1411-1414 is labeled in view 1400 according to one example use case. Each of ports 1411-1414 is connected to a shared center conductor 1417 within cavity walls 1416. Four stub sections 1415 are included to support center conductor 1417. In view 1400, stub sections 1415 are protruding into the page, while in view 1401 stub sections 1415 are seen in a perspective view extending from cavity walls 1416. Stub sections 1415 electrically contact (e.g., short) between center conductor 1417 and cavity walls 1416 and provide structural support to center conductor 1417. The sizing of hybrid structure 1410 can include 24 for the central region of center conductor 1417, and 24 for the length of each of stub segments 1415.

View 1402 has stub segments 1415 hidden from view, but highlights an example manufactured or fabricated version of hybrid structure 1410. The protrusions from each port comprise manufacturing stubs to ease holding of the workpiece, and can be removed after completion of manufacturing. Hybrid structure 1410 can comprise a monolithic structure, manufactured using SLA and coated with copper material. Hybrid structure 1410 can be formed using any of the aforementioned techniques, with escape holes included for removal of excess material from internal RF cavities.

Figure 15:
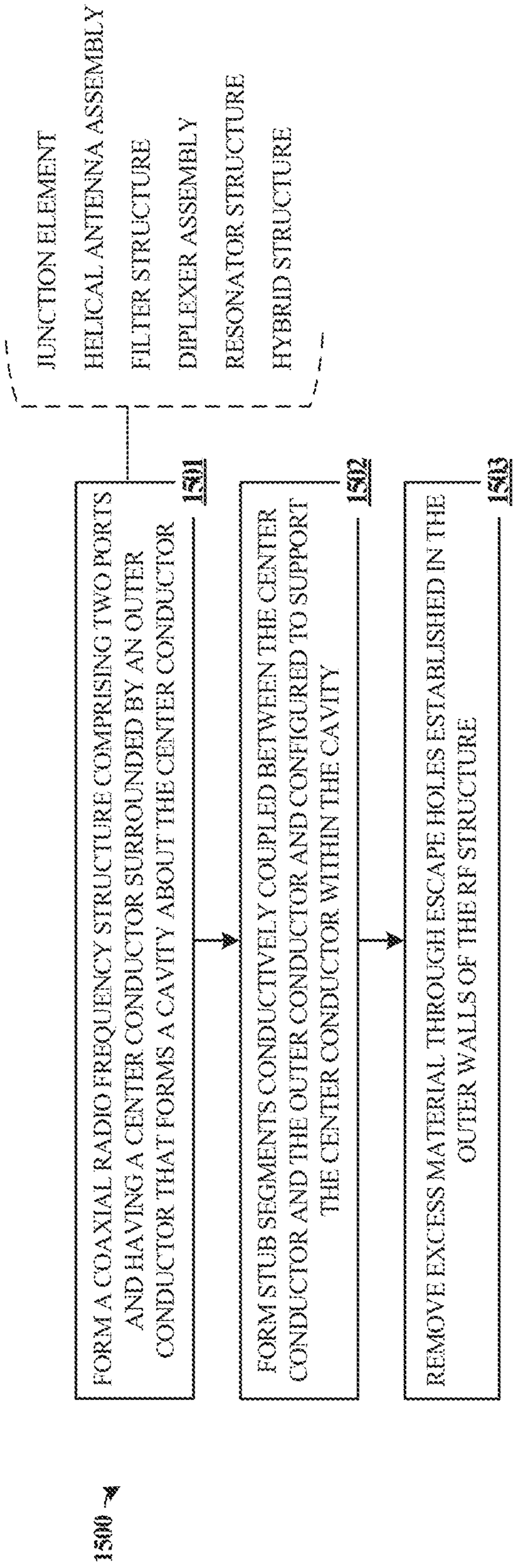
FIG. 15 illustrates example operations for manufacturing any of the enhanced implementations noted herein.

FIG. 15 illustrates example operations 1500 for manufacturing any of the enhanced implementations noted herein. In operation 1501, a coaxial radio frequency structure or assembly is formed. This coaxial RF structure comprises two ports and has a center conductor surrounded by an outer conductor that forms a cavity about the center conductor. The outer conductor can form a body or outer walls of such RF structures. Stub segments are formed which are conductively coupled between the center conductor and the outer conductor. The stub segments can be formed within stub sections which form extensions to the main outer conductor or outer walls of the RF structure. The stub segments are configured to support the center conductor within the cavity, and form RF shorts between the center conductor and the outer walls of the stub sections/extensions of the outer walls of the RF structures. Once the particular RF structure or assembly is formed, then excess material is removed through escape holes established in the outer walls of the RF structure. A size of the escape holes can be selected to provide removal of un-sintered material resultant from an additive manufacturing process while maintaining radio frequency performance over a selected frequency range. Example sizes are discussed herein, such as approximately 1 mm.

Various RF structures or assemblies can be formed using operations 1500. Among these are various types and cross-sectional shapes of coaxial RF links, junction elements found in FIGS. 1-3, helical antenna assemblies found in FIG. 3, diplexer assemblies found in FIGS. 4-9, filter structures found in FIGS. 10-12, resonator structures found in FIG. 13, and hybrid structures found in FIG. 14.

Thus, the examples herein provide for various coaxial RF structures and assemblies configured to carry, filter, alter, or multiplex radio frequency (RF) signals between ports, as well as various manufacturing techniques that can be employed to form such structures. In one example, an apparatus includes a coaxial radio frequency structure comprising at least two ports coupled to a center conductor surrounded by an outer conductor that forms a cavity about the center conductor. The apparatus also includes one or more stub sections having stub segments configured to support the center conductor within the cavity, and these stub segments are shorted or conductively coupled between center conductors and the outer conductors or outer walls of the entire RF structure. Dimensional properties, such as geometries, of the one or more stubs can be selected to provide filtering of signals carried by the coaxial radio frequency structure. In another example, the coaxial radio frequency structure comprises a diplexer having two coaxial arrangements with corresponding ports merged into a combined coaxial arrangement having a combined port. Various filtering can be achieved by the stub sections/segments and their associated properties, as well as properties of the center conductor and outer walls. When compact arrangements are desired, the stub sections/segments can be routed from the center conductor in more than two dimensions. Also, the cross-sectional shape of the center conductor can be selected from among circular, elliptical, square, rectangular, triangular, hexagonal, and irregular shapes, among others. Various conductive materials can be employed to form the coaxial radio frequency structures discussed herein, such as copper, aluminum, magnesium, silver, gold, and nickel, among others, including combinations, composites, or alloys thereof. Further example conductive materials include CuNi2SiCr and Inconel 718. When SLA processes employ polymer materials, various surface coatings, platings, treatments, or material impregnations can be included to form conductive surfaces.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:

a coaxial radio frequency structure comprising at least two ports and having a center conductor surrounded by an outer conductor formed as a single monolithic body that establishes a cavity about the center conductor;

stub segments conductively coupled between the center conductor and the outer conductor and configured to support the center conductor within the cavity; and holes formed in the outer conductor about the center conductor, wherein a size of the holes is selected to provide removal of un-sintered material resultant from an additive manufacturing process while maintaining radio frequency performance over a selected frequency range.

2. The apparatus of claim 1, wherein the stub segments are routed away from the center conductor along routes comprising more than two dimensions.

3. The apparatus of claim 1, wherein the stub segments are joined perpendicularly from the center conductor routed along a folded path to align along an axial orientation with respect to the coaxial radio frequency structure.

4. The apparatus of claim 1, comprising: a first portion of the stub segments sized to provide a low-pass filter; and a second portion of the stub segments sized to provide a high-pass filter.

5. The apparatus of claim 1, wherein the coaxial radio frequency structure forms a junction element configured to couple two coaxial connections.

6. A method, comprising:

by an additive manufacturing process, forming a coaxial radio frequency structure comprising at least two ports and having a center conductor surrounded by an outer conductor formed as a single monolithic body that establishes a cavity about the center conductor;

by the additive manufacturing process, forming stub segments conductively coupled between the center conductor and the outer conductor and configured to support the center conductor within the cavity; and by the additive manufacturing process, forming holes in the outer conductor about the center conductor, wherein a size of the holes is selected to provide removal of un-sintered material resultant from the additive manufacturing process while maintaining radio frequency performance over a selected frequency range.

7. The method of claim 6, comprising:

forming the coaxial radio frequency structure to establish a filter structure formed having dimensional properties of the stub segments selected to provide high pass filtering or low pass filtering of signals carried by the coaxial radio frequency structure.

8. The method of claim 6, comprising:

forming the stub segments as routed perpendicularly from the center conductor and folded to align along an axial orientation with respect to the coaxial radio frequency structure;

wherein a first portion of the stub segments are sized to provide a low-pass filter; and wherein a second portion of the stub segments are sized to provide a high-pass filter.

9. The method of claim 6, comprising:

forming the coaxial radio frequency structure to establish a junction element configured to couple two coaxial connections.

* * * * *